(12) United States Patent
Yamada et al.

(10) Patent No.: US 11,318,653 B2
(45) Date of Patent: May 3, 2022

(54) TEMPERATURE CONTROL DEVICE, TEMPERATURE CONTROL METHOD, AND NON-TRANSITORY COMPUTER-READABLE STORAGE MEDIUM

(71) Applicant: OMRON Corporation, Kyoto (JP)

(72) Inventors: Takaaki Yamada, Kusatsu (JP); Takashi Sakaguchi, Takatsuki (JP)

(73) Assignee: OMRON Corporation, Kyoto (JP)

( * ) Notice: Subject to any disclaimer, the term of this patent is extended or adjusted under 35 U.S.C. 154(b) by 160 days.

(21) Appl. No.: 16/639,563

(22) PCT Filed: Dec. 20, 2018

(86) PCT No.: PCT/JP2018/046939
§ 371 (c)(1),
(2) Date: Feb. 15, 2020

(87) PCT Pub. No.: WO2019/150820
PCT Pub. Date: Aug. 8, 2019

(65) Prior Publication Data
US 2021/0129405 A1 May 6, 2021

(30) Foreign Application Priority Data
Jan. 31, 2018 (JP) .............................. JP2018-014651

(51) Int. Cl.
*B29C 45/78* (2006.01)
*B29C 48/92* (2019.01)
*B29C 45/74* (2006.01)

(52) U.S. Cl.
CPC .............. *B29C 45/78* (2013.01); *B29C 45/74* (2013.01); *B29C 48/92* (2019.02);
(Continued)

(58) Field of Classification Search
CPC ............ B29C 2945/76969; G05B 2219/45244
See application file for complete search history.

(56) References Cited

U.S. PATENT DOCUMENTS

| 5,456,870 A | 10/1995 | Bulgrin | |
| 2017/0274571 A1* | 9/2017 | Altonen | ................ B29C 45/766 |

FOREIGN PATENT DOCUMENTS

| CN | 101394984 | 3/2009 |
| JP | H05228973 | 9/1993 |
| (Continued) | | |

OTHER PUBLICATIONS

JP 2005-35090 A, machine translation (Year: 2005).*
(Continued)

*Primary Examiner* — Galen H Hauth
(74) *Attorney, Agent, or Firm* — JCIPRNET (57) ABSTRACT

In a temperature control device, a resin flow channel is formed from a nozzle section and a cylinder section that is connected to the nozzle section and the device controls the temperature of the resin that flows in the resin flow channel. The temperature control device is provided with: a first temperature sensor for detecting the nozzle temperature of the resin flowing through the nozzle section; a first temperature control unit for performing PID control so that the nozzle temperature achieves a first target temperature; multiple second temperature sensors for detecting the cylinder temperature of the resin flowing through the cylinder section; and second temperature control units for performing PID control so that the cylinder temperature achieves a second target temperature. The second temperature control units perform PID control of the cylinder temperature using temperature control information from the first temperature control unit.

10 Claims, 6 Drawing Sheets

(52) U.S. Cl.
CPC .............. *B29C 2945/7604* (2013.01); *B29C 2945/76658* (2013.01); *B29C 2948/92209* (2019.02); *B29C 2948/92704* (2019.02)

(56) References Cited

FOREIGN PATENT DOCUMENTS

| | | |
|---|---|---|
| JP | H05228982 | 9/1993 |
| JP | H05237892 | 9/1993 |
| JP | 2005035090 | 2/2005 |
| JP | 2006289781 | 10/2006 |
| JP | 4042645 | 2/2008 |
| JP | 4112552 | 7/2008 |
| JP | 2011079222 | 4/2011 |
| JP | 2013001015 | 1/2013 |
| JP | 201352510 | 3/2013 |
| JP | 5457396 | 4/2014 |
| JP | 2015116793 | 6/2015 |
| JP | 2016083778 | 5/2016 |
| JP | 2018008424 | 1/2018 |
| KR | 101407203 | 6/2014 |
| TW | 201313442 | 4/2013 |
| WO | 2016084369 | 6/2016 |

OTHER PUBLICATIONS

JP H5-237892, machine translation (Year: 1993).*
Robert J. Bibbero et al., "Microprocessors in Instruments and Control", National Defense Industry Press, Feb. 1984, pp. 1-7.
"Office Action of China Counterpart Application", dated Apr. 16, 2021, with English translation thereof, pp. 1-20.
"International Search Report (Form PCT/ISA/210) of PCT/JP2018/046939," dated Mar. 26, 2019, with English translation thereof, pp. 1-4.
"Written Opinion of the International Searching Authority (Form PCT/ISA/237) of PCT/JP2018/046939," dated Mar. 26, 2019, with English translation thereof, pp. 1-10.
Office Action of Taiwan Counterpart Application, with English translation thereof, dated May 2, 2019, pp. 1-14.
"Office Action of Japan Counterpart Application" with English translation thereof, dated Feb. 9, 2021, p. 1-p. 8.

* cited by examiner

TEMPERATURE CONTROL DEVICE, TEMPERATURE CONTROL METHOD, AND NON-TRANSITORY COMPUTER-READABLE STORAGE MEDIUM

CROSS-REFERENCE TO RELATED APPLICATION

This application is a 371 application of the International PCT application serial no. PCT/JP2018/046939, filed on Dec. 20, 2018, which claims the priority benefits of Japan Patent Application No. 2018-014651, filed on Jan. 31, 2018. The entirety of each of the above-mentioned patent applications is hereby incorporated by reference herein and made a part of this specification.

TECHNICAL FIELD

The invention relates to a technology for controlling a temperature of a resin in an injection molding machine and the like.

BACKGROUND ART

In the configuration described in Patent Literature 1, a plurality of temperature sensors are provided for a nozzle and a cylinder and temperature control is performed for each. In addition, the injection molding machine performs control such that a last time at which a heated part is completely heated is set to be the same as a time at which other heated parts are completely heated and thus performs temperature control.

In addition, in the configuration of the injection molding machine described in Patent Literature 2, when molding conditions or purge conditions during operation are changed, a feed forward amount of cylinder temperature control is calculated based on a time of a predetermined section and an amount of heat consumed by a molten resin and thus temperature control is performed.

CITATION LIST

Patent Literature

[Patent Literature 1]
  Japanese Patent Laid-Open No. 2016-83778
[Patent Literature 2]
  Japanese Patent Laid-Open No. 2013-1015

SUMMARY OF INVENTION

Technical Problem

However, a flow of the resin is faster than a response time of heat conduction from the heater in the nozzle to the resin. Therefore, in the configuration using configurations of Patent Literature 1 and Patent Literature 2, there is a risk of the temperature of the resin not being controlled accurately.

Accordingly, it is not possible to reduce a variation in the temperature of the resin and the molding defect rate increases.

Therefore, an objective of the present invention is to effectively perform temperature control on a resin and the like.

Solution to Problem

The temperature control device controls a temperature of a resin which flows through a resin flow channel which is formed by a nozzle section and a cylinder section connected to the nozzle section. The temperature control device includes a first temperature sensor that detects a nozzle temperature of the resin which flows through the nozzle section, a first temperature control unit that performs PID control so that the nozzle temperature reaches a first target temperature, a plurality of second temperature sensors that detect a cylinder temperature of the resin which flows through the cylinder section, and a second temperature control unit that performs PID control so that the cylinder temperature reaches a second target temperature.

The second temperature control unit performs PID control on the cylinder temperature using temperature control information from the first temperature control unit.

In this configuration, based on the temperature control information of the nozzle section, it is possible to perform temperature control on the cylinder section. Accordingly, it is possible to effectively perform temperature control on the nozzle section and it is possible to reduce a molding defect rate.

The temperature control information of the temperature control device is preferably the nozzle temperature or a temperature deviation between the nozzle temperature and the first target temperature.

In this configuration, it is possible to perform control according to an actual temperature.

The temperature control device preferably includes a temperature control information setting unit that sets a gain constant or a delay characteristic according to a distance between a control position for the cylinder temperature and a control position for the nozzle temperature respectively and corrects the temperature control information.

In this configuration, it is possible to perform temperature control in consideration of the positional relationship between the nozzle section and the cylinder section.

At least one of the plurality of second temperature control units of the temperature control device preferably adds the temperature control information to the second target temperature.

In this configuration, it is possible to perform temperature control according to an actually measured value.

At least one of the plurality of second temperature control units of the temperature control device preferably multiplies a gain constant before adding the temperature control information to the second target temperature.

In this configuration, it is possible to perform temperature control according to an actually measured value.

The gain constant of the temperature control device is preferably larger than 0 and 1 or less.

In this configuration, it is possible to perform temperature control more stably.

At least one of the plurality of second temperature control units of the temperature control device preferably inserts a delay characteristic before adding the temperature control information to the second target temperature.

In this configuration, it is possible to reduce a sudden change in the nozzle section and it is possible to perform appropriate temperature control.

The delay characteristic of the temperature control device is preferably a primary delay or a dead time.

In this configuration, it is possible to perform temperature control according to an actual state.

Advantageous Effects of Invention

According to the invention, it is possible to effectively perform temperature control of the resin.

DESCRIPTION OF EMBODIMENTS

Application Example

Figure 2:
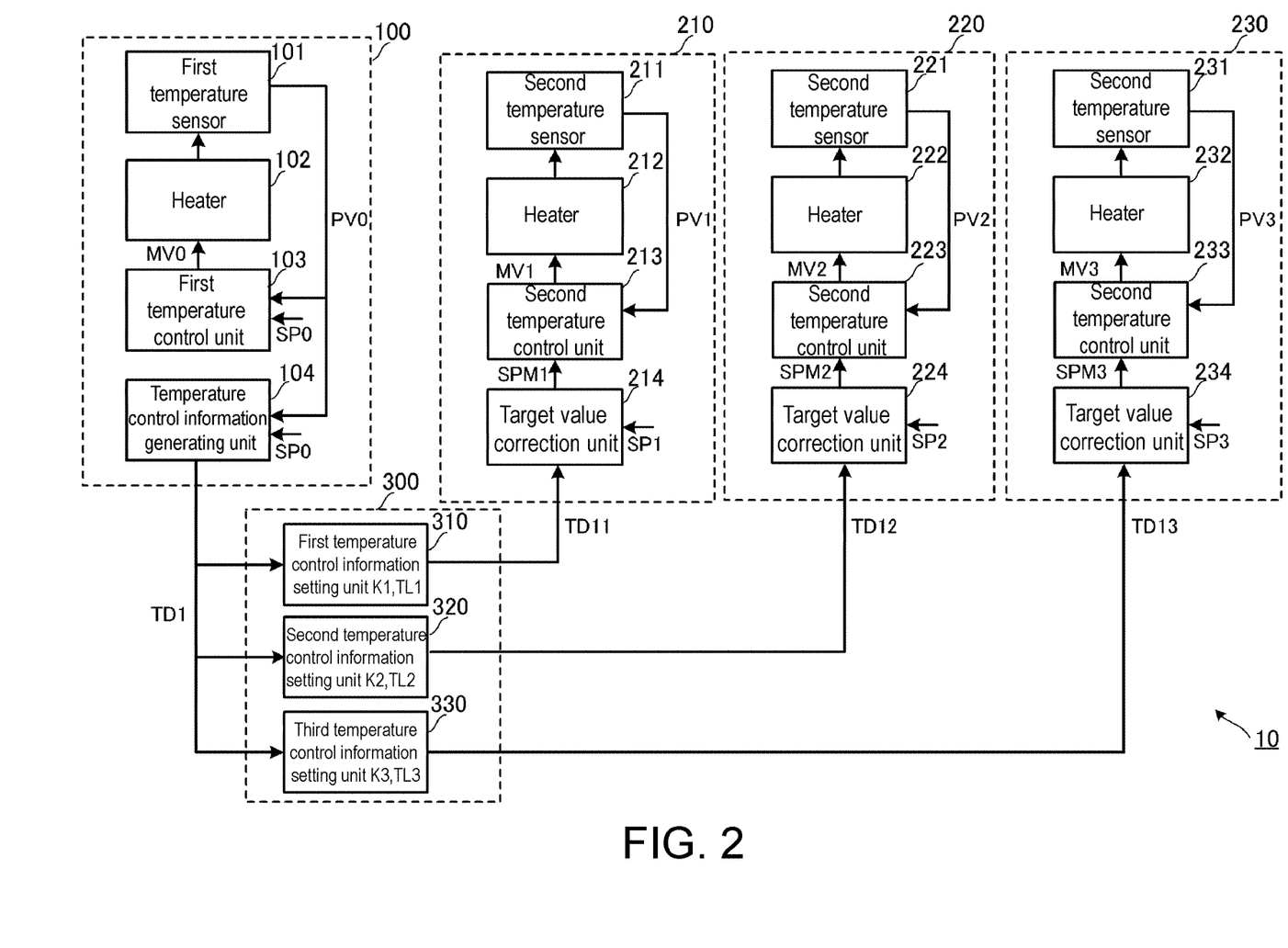
FIG. 2 is a block diagram of the temperature control device according to the first embodiment of the present invention.

First, an example to which the present invention is applied will be described with reference to FIG. 2. FIG. 2 is a block diagram of a temperature control device according to a first embodiment. The temperature control device is provided in, for example, an injection molding machine. In the following embodiments, an injection molding machine is used as a specific control example, but the device can be applied to control other extrusion molding machines and the like.

A temperature control device 10 includes a first control loop unit 100, second control loop units 210, 220, and 230, and a temperature control information setting unit 300. The first control loop unit 100 performs temperature control of a heater 102 of a nozzle section 15 of the injection molding machine. The second control loop units 210, 220, and 230 perform temperature control of heaters 212, 222, and 232 in a cylinder section 20 of the injection molding machine, respectively. The temperature control information setting unit 300 includes a first temperature control information setting unit 310, a second temperature control information setting unit 320, and a third temperature control information setting unit 330. Here, the temperature of the heaters 212, 222, and 232 is a "cylinder temperature" of the present invention.

The first control loop unit 100 includes a first temperature sensor 101, a heater 102, a first temperature control unit 103, and a temperature control information generating unit 104.

The second control loop unit 210 includes a second temperature sensor 211, the heater 212, a second temperature control unit 213, and a target value correction unit 214. The second control loop unit 220 includes a second temperature sensor 221, the heater 222, a second temperature control unit 223, and a target value correction unit 224. The second control loop unit 230 includes a second temperature sensor 231, the heater 232, a second temperature control unit 233, and a target value correction unit 234.

First, the first control loop unit 100 will be described.

The first temperature sensor 101 detects a current temperature PV0 of the nozzle section 15. The first temperature sensor 101 feeds the current temperature PV0 of the nozzle section 15 back to the first temperature control unit 103 and the temperature control information generating unit 104. The temperature control information generating unit 104 calculates temperature control information TD1 from the current temperature PV0 of the nozzle section 15 and a first target temperature SP0. The temperature control information TD1 is a current temperature PV1 of the nozzle section 15 or a temperature deviation. The temperature deviation is a difference value between the current temperature PV1 and the first target temperature SP0. For example, when the first target temperature SP0 is in degrees Celsius (° C.), the current temperature PV1 is also a Celsius temperature (° C.). Here, the current temperature PV0 of the nozzle section 15 is a "nozzle temperature" of the present invention.

The first temperature control unit 103 performs PID control using the current temperature PV0 of the nozzle section 15 and the first target temperature SP0. The first temperature control unit 103 calculates an operation amount MV0 and provides the operation amount MV0 to the heater 102. Thereby, the first temperature control unit 103 controls an electric flow to the heater 102.

Next, feedback of temperature control information from the first control loop unit 100 to the second control loop unit 210 will be described. The first control loop unit 100 feeds temperature control information back to the second control loop unit 210 through the first temperature control information setting unit 310 of the temperature control information setting unit 300.

The temperature control information generating unit 104 outputs the temperature control information TD1 to the first temperature control information setting unit 310. The first temperature control information setting unit 310 outputs temperature control information TD11 corrected by a gain constant K1 and a delay characteristic TL1 to the target value correction unit 214 of the second control loop unit 210.

More specifically, the first temperature control information setting unit 310 multiplies the temperature control information TD1 by the gain constant K1. Next, the first temperature control information setting unit 310 inserts the delay characteristic TL1 into the temperature control information TD1. Accordingly, the first temperature control information setting unit 310 can calculate the temperature control information TD11. Here, it is preferable that the first temperature control information setting unit 310 multiply the temperature control information TD1 by the gain constant K1 and then insert the delay characteristic TL1 into the temperature control information TD1. Thereby, it is possible to reduce a sudden change due to noise or the like.

The gain constant K1 is a value of 0 or more and 1 or less. This can prevent temperature control from becoming unstable. In addition, for example, the delay characteristic TL1 is a primary delay or a dead time, and is determined according to the control position (distance from the nozzle section 15) of the cylinder section 20. Here, the gain constant K1 may be set based on a control position (distance from the nozzle section 15) of the cylinder section 20 or may be set using preliminary experimental simulation results.

The target value correction unit 214 calculates a correction target value SPM1 from a difference value between a second target temperature SP1 and the temperature control information TD11 and outputs it to the second temperature control unit 213.

The second temperature control unit 213 performs PID control using the correction target value SPM1 and the current temperature PV1 of the second control loop unit 210 and calculates an operation amount MV1. The second temperature control unit 213 controls the heater 212 according to the operation amount MV1. The second temperature sensor 211 detects the temperature of the heater 212.

Next, feedback of temperature control information from the first control loop unit 100 to the second control loop unit 220 will be described. The first control loop unit 100 feeds temperature control information back to the second control loop unit 220 through the second temperature control information setting unit 320 of the temperature control information setting unit 300.

The temperature control information generating unit 104 outputs the temperature control information TD1 to the second temperature control information setting unit 320. The second temperature control information setting unit 320 outputs temperature control information TD12, which is the temperature control information TD1 corrected by a gain constant K2 and a delay characteristic TL2, to the target value correction unit 224 of the second control loop unit 220.

More specifically, the second temperature control information setting unit 320 multiplies the temperature control information TD1 by the gain constant K2. Next, the second temperature control information setting unit 320 adds the delay characteristic TL2 to the temperature control information TD1. Accordingly, the second temperature control information setting unit 320 can calculate the temperature control information TD12. Here, it is preferable that the second temperature control information setting unit 320 multiply the temperature control information TD1 by the gain constant K2 and then insert the delay characteristic TL2 into the temperature control information TD1. Thereby, it is possible to reduce a sudden change due to noise or the like.

The gain constant K2 is a value of 0 or more and 1 or less. This can prevent temperature control from becoming unstable. In addition, for example, the delay characteristic TL2 is a primary delay or a dead time, and is determined according to the control position (distance from the nozzle section 15) of the cylinder section 20. Here, the gain constant K2 may be set based on the control position (distance from the nozzle section 15) of the cylinder section 20 or may be set using preliminary experimental simulation results.

The target value correction unit 224 calculates a correction target value SPM2 from a difference value between a second target temperature SP2 and the temperature control information TD12 and outputs it to the second temperature control unit 223.

The second temperature control unit 223 performs PID control using the correction target value SPM2 and a current temperature PV2 of the second control loop unit 220 and calculates an operation amount MV2. The second temperature control unit 223 controls the heater 222 according to the operation amount MV2. The second temperature sensor 221 detects the temperature of the heater 222.

Next, feedback of temperature control information from the first control loop unit 100 to the second control loop unit 230 will be described. The first control loop unit 100 feeds temperature control information back to the second control loop unit 230 through the third temperature control information setting unit 330 of the temperature control information setting unit 300.

The temperature control information generating unit 104 outputs the temperature control information TD1 to the third temperature control information setting unit 330. The third temperature control information setting unit 330 outputs temperature control information TD13, which is the temperature control information TD1 corrected by a gain constant K3 and a delay characteristic TL3, to the target value correction unit 234 of the second control loop unit 230.

More specifically, the third temperature control information setting unit 330 multiplies the temperature control information TD1 by the gain constant K3. Next, the third temperature control information setting unit 330 inserts the delay characteristic TL3 into the temperature control information TD1. Accordingly, the third temperature control information setting unit 330 can calculate the temperature control information TD13. Here, it is preferable that the third temperature control information setting unit 330 multiply the temperature control information TD1 by the gain constant K3 and then insert the delay characteristic TL3 into the temperature control information TD1. Thereby, it is possible to reduce a sudden change due to noise or the like.

The gain constant K3 is a value of 0 or more and 1 or less. This can prevent temperature control from becoming unstable. In addition, the delay characteristic TL3 is a primary delay or a dead time, and is determined according to the control position of the cylinder section 20, that is, a distance from the nozzle section 15.

The target value correction unit 234 calculates a correction target value SPM3 from a difference value between a second target temperature SP3 and the temperature control information TD13 and outputs it to the second temperature control unit 233.

The second temperature control unit 233 performs PID control using the correction target value SPM3 and the second target temperature SP3 of the second control loop unit 210 and calculates an operation amount MV3. The second temperature control unit 233 controls the heater 232 according to the operation amount MV3. The second temperature sensor 231 detects the temperature of the heater 232.

Accordingly, the current temperature PV0 of the nozzle section 15 more effectively stabilizes at the first target temperature SP0 which is a target temperature.

That is, the temperature can be controlled before a resin reaches the nozzle section 15, and the first temperature control unit 103 stably controls the temperature of the resin in the nozzle section 15. Therefore, the effective temperature control device 10 can be realized.

Configuration Example 1

Figure 1:
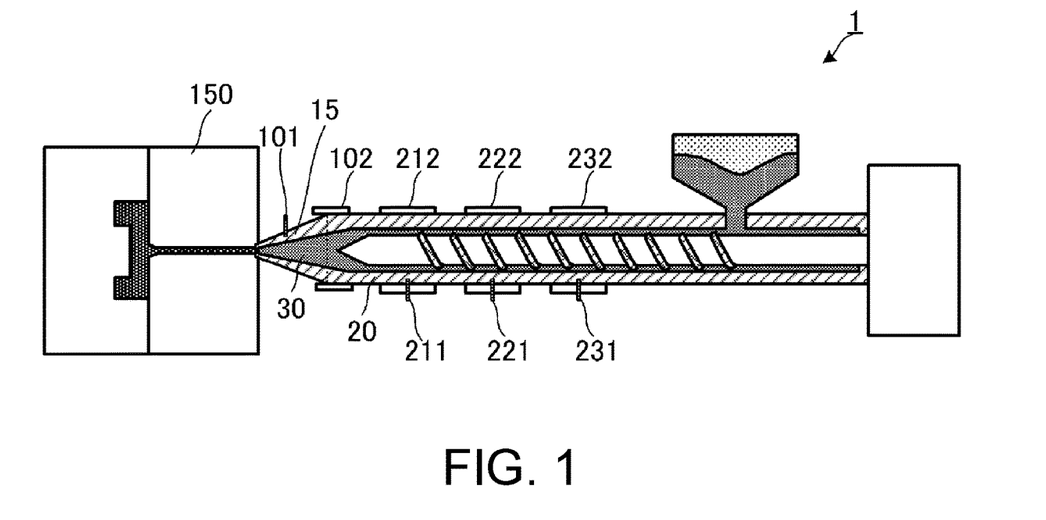
FIG. 1 is an overview diagram of a temperature control device according to a first embodiment of the present invention.
Figure 3:
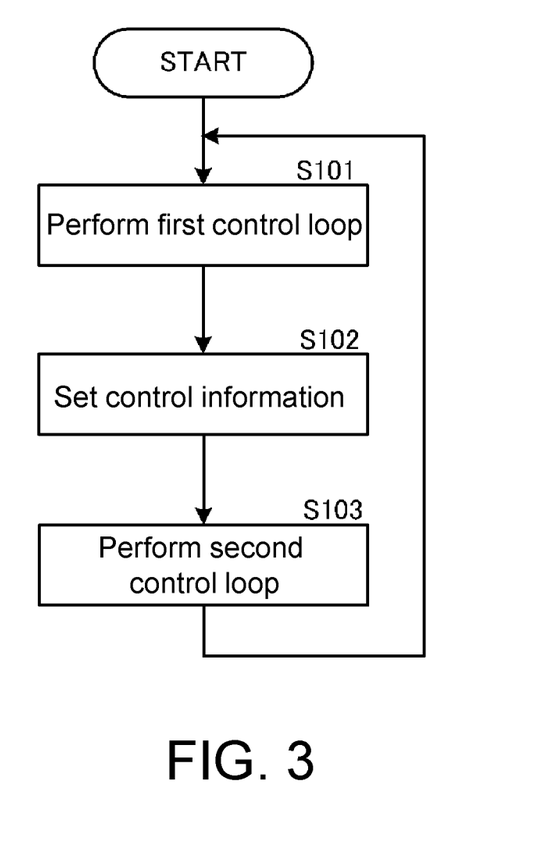
FIG. 3 is a flowchart for the temperature control device according to the first embodiment of the present invention.
Figure 4:
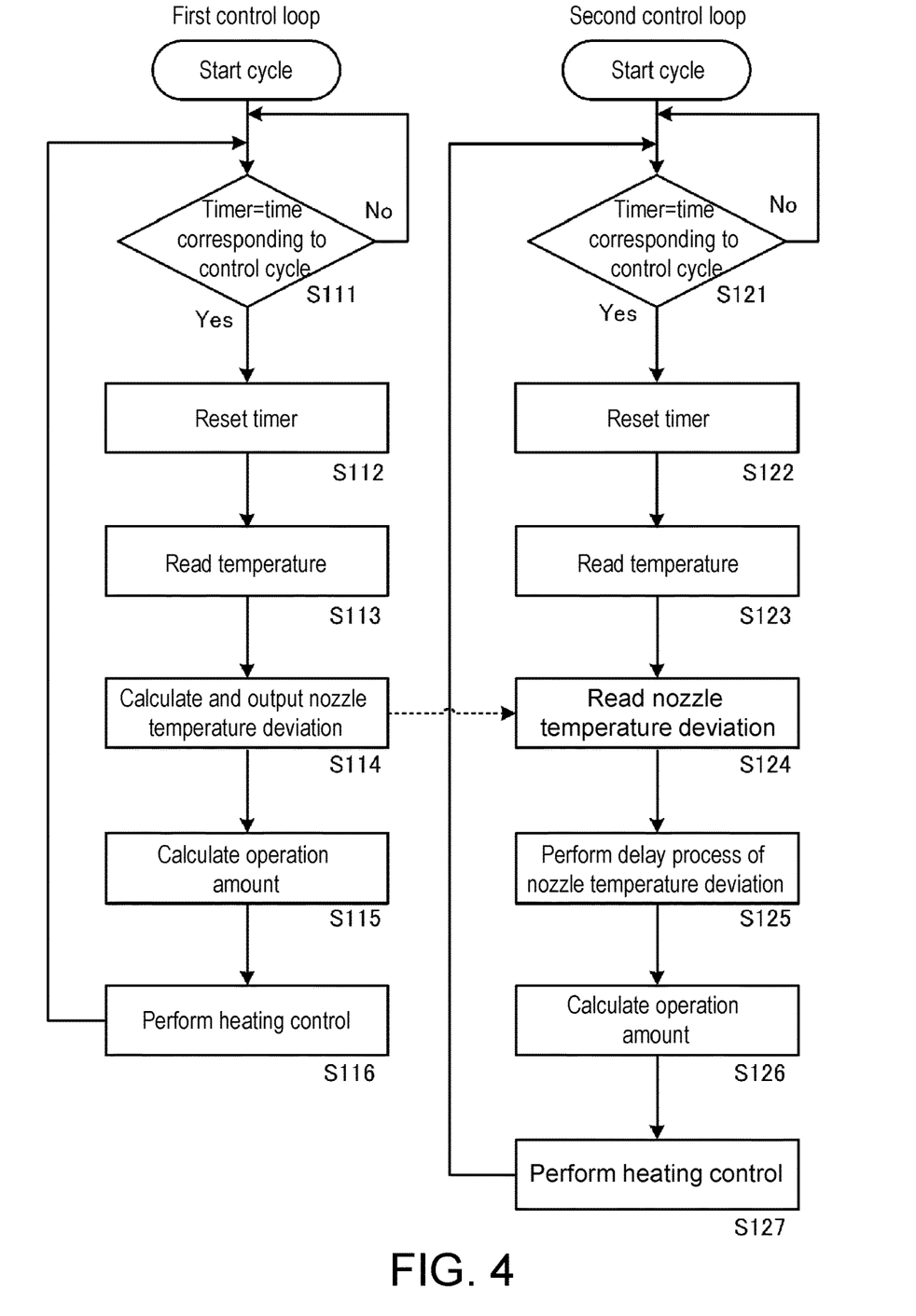
FIG. 4 is a flowchart for the temperature control device according to the first embodiment of the present invention.
Figure 5:
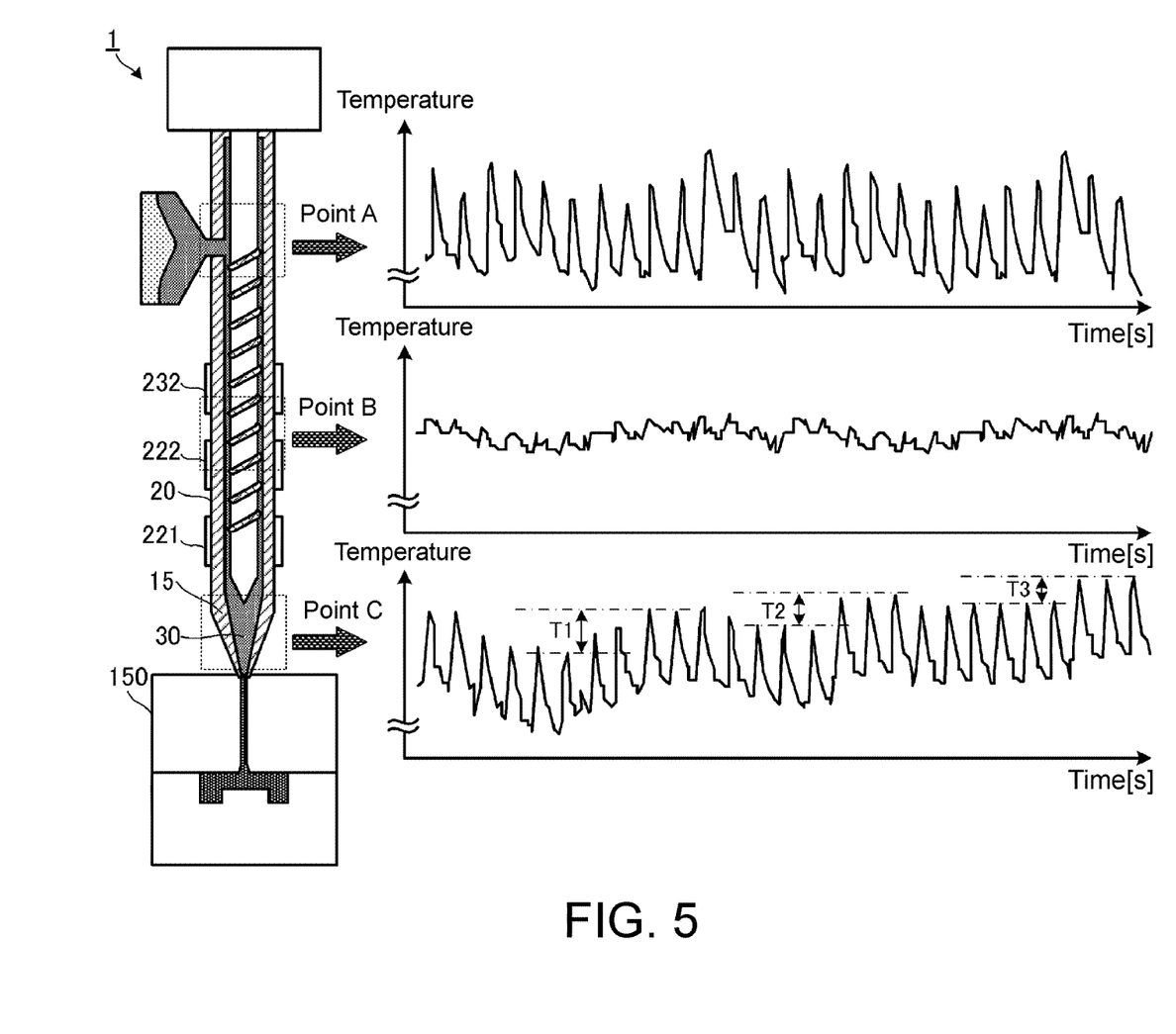
FIG. 5 is a graph showing control results of the temperature control device according to the first embodiment of the present invention.

FIG. 1 is an overview diagram of an injection molding machine provided in the temperature control device according to the first embodiment of the present invention. FIG. 2 is a block diagram of the temperature control device according to the first embodiment of the present invention. FIG. 3 is a flowchart for the temperature control device according to the first embodiment of the present invention. FIG. 4 is a detailed flowchart for the temperature control device according to the first embodiment of the present invention. FIG. 5 is a graph showing control results of the temperature control device according to the first embodiment of the present invention.

A more specific configuration example will be described with reference to FIG. 1 based on the above configuration of the temperature control device in FIG. 2.

An injection molding machine 1 includes the nozzle section 15, the cylinder section 20, a resin flow channel 30, and the heaters 212, 222, and 232. The nozzle section 15 includes the first temperature sensor 101. In addition, the heating unit of the heater 212 includes the second temperature sensor 211, the heating unit of the heater 222 includes the second temperature sensor 221, and the heating unit of the heater 232 includes the second temperature sensor 231.

The resin flow channel 30 is formed by the nozzle section 15 and the cylinder section 20 connected to the nozzle section 15. The tip of the nozzle section 15 is connected to a mold 150.

The injection molding machine 1 causes a resin to flow to the mold 150 through the resin flow channel 30 formed by the cylinder section 20 and the nozzle section 15.

The resin which flows through the resin flow channel 30 is heated in the heaters 212, 222, and 232, and the nozzle section 15.

As described above, the first control loop unit 100 that controls the temperature of the nozzle section 15 feeds temperature control information back to the second control loop units 210, 220, and 230 that control the temperature of the cylinder section 20. The heaters 212, 222, and 232 perform PID control based on temperature control information.

The first control loop unit 100 feeds temperature control information back to the heaters 212, 222, and 232 and thus temperature control is performed according to the state of the resin before the resin reaches the nozzle section 15.

Therefore, the nozzle section 15 can effectively and stably perform temperature control on the resin when it is discharged to the mold 150. Therefore, it is possible to realize the temperature control device 10 with a reduced molding defect rate.

The overall control procedure of the temperature control device 10 will be described with reference to the flowchart in FIG. 3. Here, the second control loop unit 210 will be exemplified in the following procedure, but the same control is performed in the second control loop unit 220 or the second control loop unit 230.

In addition, FIG. 3 shows a flow between controls. The first control loop unit 100 and the second control loop unit 210 are executed concurrently and sequentially.

The first control loop unit 100 performs PID control and calculates the temperature control information TD1. The first control loop unit 100 outputs the temperature control information TD1 to the first temperature control information setting unit 310 (S101).

The first temperature control information setting unit 310 outputs the temperature control information TD11, which is the temperature control information TD1 corrected by the gain constant K1 and the delay characteristic TL1, to the second control loop unit 210 (S102).

The second control loop unit 210 performs PID control using the temperature control information TD11 and the second target temperature SP1 and calculates the operation amount MV1. The second control loop unit 210 performs temperature control on the heater 212 (S103). That is, for example, the process in the second control loop unit 210 at a time t is performed based on the result of the first control loop unit 100 at a time t−1.

Next, based on the control procedure in FIG. 3, detailed control procedures of the temperature control device 10 by the first control loop unit 100 and the second control loop unit 210 will be described with reference to FIG. 4.

First, a control procedure of the first control loop unit 100 will be described.

When cycle control starts, a timer is activated (S111). When the time indicated by the timer and the time corresponding to the control cycle match (Yes in S111), the first temperature control unit 103 resets the timer, and causes the process of Step S113 and subsequent processes to be performed (S112). On the other hand, when the time indicated by the timer and the time corresponding to the control cycle do not match (No in S111), Step S111 is repeatedly performed until the time indicated by the timer and the time corresponding to the control cycle match.

The first temperature control unit 103 reads the temperature of the nozzle section 15 from the first temperature sensor 101 (S113).

The first temperature control unit 103 calculates the temperature control information TD1 of the nozzle section 15. In addition, the temperature control information generating unit 104 outputs the temperature control information TD1 to the first temperature control information setting unit 310 (S114). Here, temperature control information may be the current temperature PV0 detected by the first temperature sensor 101.

The first temperature control unit 103 performs PID control based on temperature control information and calculates the operation amount MV0 of the nozzle section 15 (S115).

The first temperature control unit 103 performs heating control on the heater 102 based on the operation amount MV0 (S116).

Next, a control procedure of a second temperature control loop will be described. When cycle control starts, the timer is activated (S121). When the time indicated by the timer and the time corresponding to the control cycle match (Yes in S121), the second temperature control unit 213 resets the timer and causes the process of Step S123 and subsequent processes to be performed (S122). Here, when the time indicated by timer and the time corresponding to the control cycle do not match (No in S121), Step S121 is repeatedly performed until the time indicated by the timer and the time corresponding to the control cycle match.

The second temperature control unit 213 reads the current temperature PV1 of the cylinder section 20 from the second temperature sensor 211 (S123). The timer of the first control loop unit 100 and the timer of the second control loop unit 210 are synchronized and have the same control cycle.

The first temperature control information setting unit 310 reads the temperature control information TD1 from the temperature control information generating unit 104 (S124).

The first temperature control information setting unit 310 calculates the temperature control information TD11 from the temperature control information TD1, the gain constant K1, and the delay characteristic TL1 and outputs it to the target value correction unit 214 (S125).

The target value correction unit 214 calculates the correction target value SPM1 based on the temperature control information TD11 and the second target temperature SP1. The second temperature control unit 213 performs PID control based on the correction target value SPM1 and the current temperature PV1 and calculates the operation amount MV1 (S126).

The second temperature control unit 213 performs heating control on the heater 212 based on the operation amount MV1 (S127).

As shown in FIG. 5, graphs show examples of change in the temperature at the point A farthest from the nozzle section 15, the point B near the heating unit of the cylinder section 20, and the point C near the nozzle section 15 on which feedback control using the above configuration is performed.

As shown in FIG. 5, at the point A and the point B, there is little change in the temperature deviation. However, at the point C, temperature deviations T1, T2, and T3 change over time. More specifically, the temperature deviation changes through temperature deviationT1>temperature deviationT2>temperature deviationT3.

That is, when feedback control using the above temperature control device 10 is performed, it is possible to reduce the temperature deviation in the nozzle section 15. Accordingly, the nozzle section 15 can effectively and stably control the temperature of the resin when it is discharged to the mold 150. Therefore, it is possible to realize the temperature control device 10 that reduces a molding defect rate.

Configuration Example 2

Figure 6:
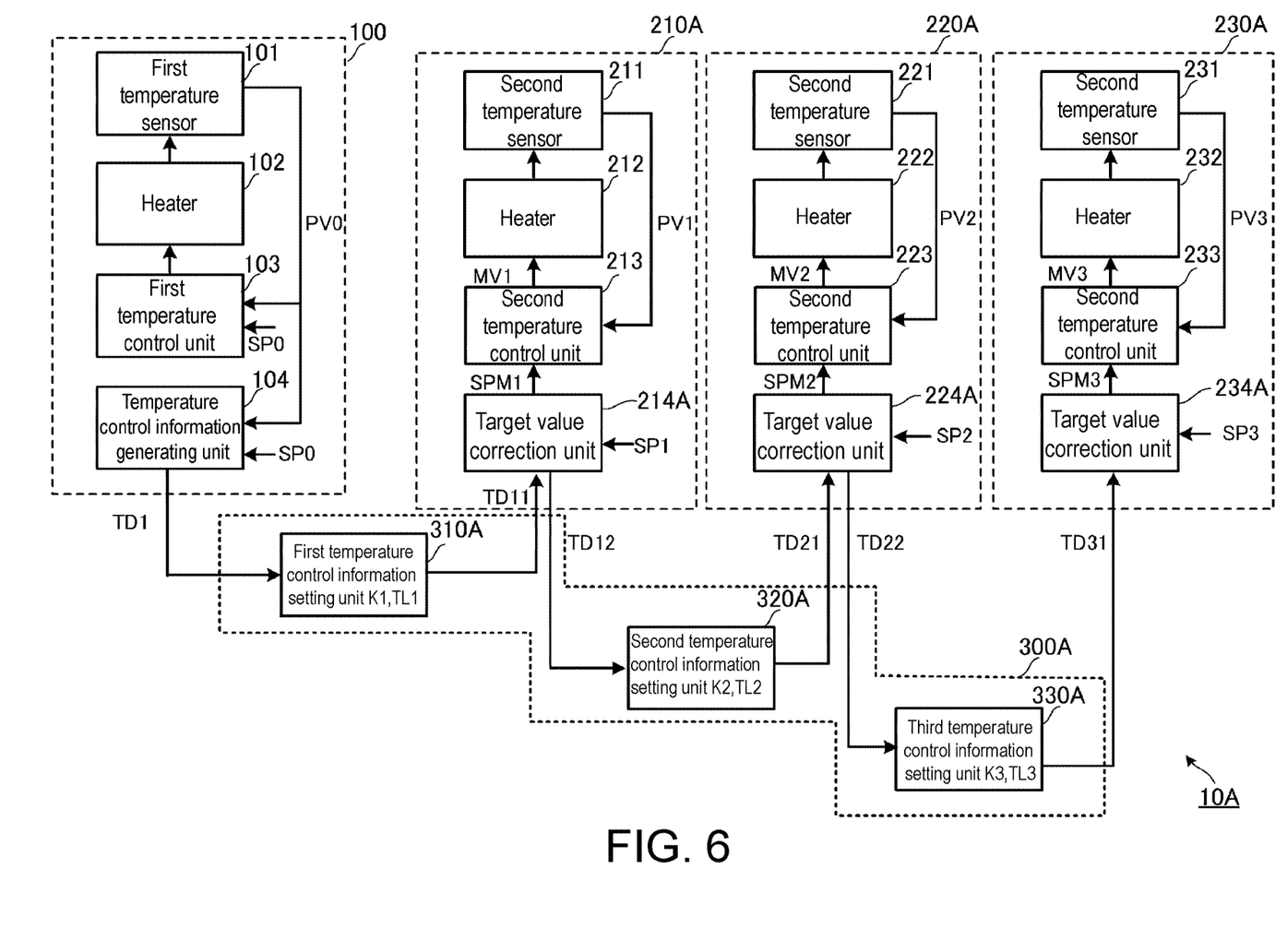
FIG. 6 is a block diagram of a temperature control device according to a second embodiment of the present invention.

Next, an overview of a temperature control device according to a second embodiment will be described with reference to FIG. 6. FIG. 6 is a block diagram of a temperature control device according to the second embodiment of the present invention.

The second embodiment differs from the first embodiment in a method of performing feedback of temperature control information. Other parts are the same as in the first embodiment, and the same parts will not be described.

A temperature control device 10A includes the first control loop unit 100, second control loop units 210A, 220A, and 230A, and a temperature control information setting unit 300A. The temperature control information setting unit 300A includes a first temperature control information setting unit 310A, a second temperature control information setting unit 320A, and a third temperature control information setting unit 330A. The first control loop unit 100 performs temperature control of the heater 102 of the nozzle section 15 of the injection molding machine. The second control loop units 210A, 220A, and 230A perform temperature control of the heaters 212, 222, and 232 in the cylinder section 20 of the injection molding machine.

The second control loop unit 210A includes the second temperature sensor 211, the heater 212, the second temperature control unit 213, and a target value correction unit 214A. The second control loop unit 220A includes the second temperature sensor 221, the heater 222, the second temperature control unit 223, and a target value correction unit 224A. The second control loop unit 230A includes the second temperature sensor 231, the heater 232, the second temperature control unit 233, and a target value correction unit 234A.

First, feedback of temperature control information from the first control loop unit 100 to the second control loop unit 210A will be described. The first control loop unit 100 feeds temperature control information back to the second control loop unit 210A through the first temperature control information setting unit 310A of the temperature control information setting unit 300A.

The temperature control information generating unit 104 outputs the temperature control information TD1 to the first temperature control information setting unit 310A. The first temperature control information setting unit 310A outputs the temperature control information TD11 corrected by the gain constant K1 and the delay characteristic TL1 to the target value correction unit 214A of the second control loop unit 210A.

More specifically, the first temperature control information setting unit 310A multiplies the temperature control information TD1 by the gain constant K1. Next, the first temperature control information setting unit 310A inserts the delay characteristic TL1 into the temperature control information TD1. Accordingly, the first temperature control information setting unit 310A can calculate the temperature control information TD11.

The target value correction unit 214A calculates the correction target value SPM1 from a difference value between the second target temperature SP1 and the temperature control information TD11 and outputs it to the second temperature control unit 213.

The second temperature control unit 213 performs PID control using the correction target value SPM1 and the current temperature PV1 of the second control loop unit 210 and calculates the operation amount MV1. The second temperature control unit 213 controls the heater 212 according to the operation amount MV1. The second temperature sensor 211 detects the temperature of the heater 212.

Here, in order to perform feedback to the second control loop unit 220A, the target value correction unit 214A outputs the temperature control information TD12 to the second temperature control information setting unit 320A. The temperature control information TD12 is calculated from the second target temperature SP1 and the current temperature PV1. That is, a deviation between the current temperature PV1 and the second target temperature SP1 is used in the temperature control information TD12. Here, the temperature control information TD12 may be the current temperature PV1.

Next, feedback of temperature control information from the second control loop unit 210A to the second control loop unit 220A will be described. The second control loop unit 210A feeds temperature control information back to the second control loop unit 220A through the second temperature control information setting unit 320A of the temperature control information setting unit 300A.

The second temperature control information setting unit 320A outputs temperature control information TD21 corrected by the gain constant K2 and the delay characteristic TL2 to the target value correction unit 224A of the second control loop unit 220A.

More specifically, the second temperature control information setting unit 320A multiplies the temperature control information TD12 by the gain constant K2. Next, the second temperature control information setting unit 320A inserts the delay characteristic TL2 into the temperature control information TD12. Accordingly, the second temperature control information setting unit 320A can calculate the temperature control information TD21.

The target value correction unit 224A calculates the correction target value SPM2 from a difference value between the second target temperature SP2 and the temperature control information TD21 and outputs it to the second temperature control unit 223.

The second temperature control unit 223 performs PID control using the correction target value SPM2 and the current temperature PV2 of the second control loop unit 220 and calculates the operation amount MV2. The second temperature control unit 223 controls the heater 222 according to the operation amount MV2. The second temperature sensor 221 detects the temperature of the heater 212.

Here, in order to perform feedback to the second control loop unit 230A, the target value correction unit 224A outputs temperature control information TD22 to the third temperature control information setting unit 330A. The temperature control information TD22 is calculated from the second target temperature SP2 and the current temperature PV2. That is, a deviation between the current temperature PV2 and the second target temperature SP2 is used in the temperature control information TD22. Here, the temperature control information TD22 may be the current temperature PV2.

Next, feedback of temperature control information from the second control loop unit 220A to the second control loop unit 230A will be described. The second control loop unit 220A feeds temperature control information back to the second control loop unit 230A through the third temperature control information setting unit 330A of the temperature control information setting unit 300A.

The third temperature control information setting unit 330A outputs temperature control information TD31 corrected by the gain constant K3 and the delay characteristic TL3 to the target value correction unit 234A of the second control loop unit 230A.

More specifically, the third temperature control information setting unit 330A multiplies the temperature control information TD22 by the gain constant K3. Next, the third temperature control information setting unit 330A inserts the delay characteristic TL3 into the temperature control information TD22. Accordingly, the third temperature control information setting unit 330A can calculate the temperature control information TD31.

The target value correction unit 234A calculates the correction target value SPM3 from a difference value between the second target temperature SP3 and the temperature control information TD31 and outputs it to the second temperature control unit 233.

The second temperature control unit 233 performs PID control using the correction target value SPM3 and a current temperature PV3 of the second control loop unit 230 and calculates the operation amount MV3. The second temperature control unit 233 controls the heater 232 according to the operation amount MV3. The second temperature sensor 231 detects the temperature of the heater 212.

Accordingly, the current temperature PV1 of the nozzle section 15 more effectively stabilizes at the first target temperature SP0 which is a target temperature.

Here, a plurality of second control loop units have been exemplified in the above configuration. However, the above configuration can be realized using at least one second control loop.

In addition, the above control method is preferably used when the temperature rise of the temperature control device is constant. Accordingly, it is possible to perform more appropriate feedback control.

The invention claimed is:

1. A temperature control device for controlling a temperature of a resin which flows through a resin flow channel which is formed by a nozzle section and a cylinder section connected to the nozzle section, comprising:
a first temperature sensor that detects a nozzle temperature of the resin which flows through the nozzle section;
a first temperature control unit that performs PID control so that the nozzle temperature reaches a first target temperature;
a second temperature sensor that detects a cylinder temperature of the resin which flows through the cylinder section; and
a plurality of second temperature control units that perform PID control so that the cylinder temperature reaches a second target temperature,
wherein the second temperature control units perform PID control on the cylinder temperature using temperature control information from the first temperature control unit, and
the first temperature control unit feeds temperature control information back to the plurality of second temperature control units.

2. The temperature control device according to claim 1, wherein the temperature control information is the nozzle temperature or a temperature deviation between the nozzle temperature and the first target temperature.

3. The temperature control device according to claim 1, comprising
a temperature control information setting unit that sets a gain constant or a delay characteristic according to a distance between a control position for the cylinder temperature and a control position for the nozzle temperature respectively and corrects the temperature control information.

4. The temperature control device according to claim 1, wherein at least one of the plurality of second temperature control units adds the temperature control information to the second target temperature.

5. The temperature control device according to claim 3, wherein at least one of the plurality of second temperature control units multiplies a gain constant before adding the temperature control information to the second target temperature.

6. The temperature control device according to claim 5, wherein the gain constant is larger than 0 and 1 or less.

7. The temperature control device according to claim 3, wherein at least one of the plurality of second temperature control units inserts a delay characteristic before adding the temperature control information to the second target temperature.

8. The temperature control device according to claim 7, wherein the delay characteristic is a primary delay or a dead time.

9. A temperature control method for controlling a temperature of a resin which flows through a resin flow channel which is formed by a nozzle section and a cylinder section connected to the nozzle section, the temperature control method causing a computer to execute:
a step of detecting a nozzle temperature of the resin which flows through the nozzle section;
a step of performing PID control by a first temperature control unit so that the nozzle temperature reaches a first target temperature;
a step of detecting a cylinder temperature of the resin which flows through the cylinder section; and
a step of performing PID control by a plurality of second temperature control units so that the cylinder temperature reaches a second target temperature,
wherein the step of performing PID control on the cylinder temperature is performed using temperature control information from the first temperature control unit, and
the temperature control information from the first temperature control unit is fed back to the plurality of second temperature control units.

10. A non-transitory computer-readable storage medium recording a temperature control program for controlling a temperature of a resin which flows through a resin flow channel which is formed by a nozzle section and a cylinder section connected to the nozzle section, the temperature control program causing a computer to execute:
a step of detecting a nozzle temperature of the resin which flows through the nozzle section;
a step of performing PID control by a first temperature control unit so that the nozzle temperature reaches a first target temperature;
a step of detecting a cylinder temperature of the resin which flows through the cylinder section; and
a step of performing PID control by a plurality of second temperature control units so that the cylinder temperature reaches a second target temperature,
wherein the computer is caused to execute the step of performing PID control on the cylinder temperature using temperature control information from the first temperature control unit, and the temperature control information from the first emperature control unit is fed back to the plurality of second temperature control units.

\* \* \* \* \*